UNITED STATES PATENT OFFICE.

WINFIELD S. PIERCE, OF SEATTLE, WASHINGTON, ASSIGNOR TO UNION POWDER COMPANY, OF SEATTLE, WASHINGTON, A CORPORATION OF WASHINGTON.

EXPLOSIVE.

No. 892,302.      Specification of Letters Patent.      Patented June 30, 1908.

Application filed August 8, 1907. Serial No. 387,682.

*To all whom it may concern:*

Be it known that I, WINFIELD S. PIERCE, a citizen of the United States, residing at Seattle, in the county of King and State of Washington, have invented certain new and useful Improvements in Explosives; and I do declare the following to be a full, clear, and exact description of the invention, such as will enable others skilled in the art to which it appertains to make and use the same.

My invention relates to explosives.

It has for its object to produce an explosive adapted for both large and small firearms, and for blasting, and which can be used wherever a high-grade explosive is desired; which is not affected by atmospheric changes, acting as well many degrees below zero as it will many degrees above, and as effectively in a wet atmosphere as in a dry atmosphere; which is practically smokeless and lessens the liability to explode by trituration, concussion or jar; will not deteriorate in storage either in open or sealed retainers, and which will have other advantages hereinafter set forth.

To the accomplishment of the foregoing the invention consists in an explosive having the features and characteristics hereinafter described and then sought to be clearly defined by the claims.

In preparing the explosive, I form a solution by mixing, say, cane sugar, which is a carbohydrate, with sufficient water for the purpose, in a suitable vessel, at a temperature to bring it to the boiling point, and continue the heating until the solution has a specific gravity of one and four-tenths, or thereabout, the specific gravity being taken at a temperature of say 200° Fah. In this solution, the cane sugar may be in the proportion of thirty-nine (39) parts of the sugar to sufficient quantity of water to produce the solution having the specific gravity mentioned under the temperature stated.

To the solution first mentioned is added a caramel preparation such as hereinafter mentioned in the proportion of say one and one-half (1½) parts of the preparation, or thereabouts, to the proportion of cane sugar mentioned for the first solution, said preparation being added gradually to the first solution and the heat continued while the mixture is stirred to effect a thorough incorporation of the ingredients. The preparation added to the first solution is made by subjecting, say cane sugar, say sixteen (16) ounces, or thereabout, in an open vessel to heat suitably applied until the temperature is raised to about 404° F., and continuing the heat at that temperature until two (2) molecules, or about two molecules, of water is thrown off or evaporated. This forms a solid cake consisting of combustible matter containing carbonic acid, acetic acid, and an empyreumatic oil producing elements, and approximately twenty-five (25) per cent. of carbon which burns without residue. After the desired proportion of said preparation has been thoroughly incorporated with the first solution as previously mentioned, the mixture is removed and while still hot there is gradually added to it an alcoholic extract of alkanet and shellac, in quantity sufficient to change the color of the mixture or compound from a dark brown to a dark or sage green. As soon as the change in color to a dark or sage green takes place, about fifty-seven (57) parts of potassium chlorate is added and thoroughly incorporated with the other ingredients comprising the mixture or compound. The mixture is then cooled, and dried in any suitable way, and by suitable triturating means is granulated in sizes desired.

The alcoholic extract is made by mixing say four (4) ounces of alkanet root with sixty (60) grains of powdered shellac to which is applied say one (1) quart of 188 proof grain alcohol in a suitable percolator and thus is formed a solution of shellac and the constituents of alkanet soluble in alcohol but insoluble in water.

By the employment of the caramel preparation mentioned which ignites at a higher temperature than the oxygen of the oxygen yielding substance, which is an alkaline chlorate, causes the carbo-hydrates of the compound to ignite, the gases in the gun barrel are consumed, residue due to precipitation of unconsumed matter is reduced to the minimum or practically eliminated, recoil in the gun is reduced to the minimum, greater power of penetration given to the explosive, and the explosive rendered practically smokeless.

By employment of the alcoholic extract of alkanet and shellac a chemical change due to the weak acid condition of the extract is presumably effected, the exact nature of which however has not up to this time been determinable, and by it the granulation of the explosive is believed to be facilitated and made more complete and permanency given to it. The extract also forms an insoluble protective coating against moisture and atmospheric influences or changes in the explosive. It also lessens the liability of explosion from trituration, concussion or jar, prevents accumulation of heat while in storage bins, sacks or sealed packages, and otherwise improves the explosive.

While I have stated the proportions preferred to be used and what are considered to be best for large or small guns yet the explosive is equally well adapted for blasting purposes, as changes can be made in the oxygen yielding and carbo-hydrate ingredients as dictated by experience in the art to adapt the explosive for blasting purposes. This can be done without departing from the novel features of the invention set forth as under the invention it is possible to compound the explosive in obedience to a sliding scale of strength according to the lifting or penetrating power desired.

Having described my invention and set forth its merits, what I claim is:—

1. An explosive comprising an alkaline chlorate, and a carbo-hydrate, such as specified, caramel, shellac, and constituents of alkanet, substantially as described.

2. An explosive comprising an oxygen-yielding and a carbonaceous substance such as specified; caramel, and an extract of alkanet insoluble in water, substantially as described.

3. An explosive comprising an oxygen yielding and a carbonaceous substance such as specified; caramel, shellac and constituents of alkanet soluble in alcohol, substantially as described.

In testimony whereof I affix my signature in presence of two witnesses.

WINFIELD S. PIERCE.

Witnesses:
 GEO. F. PALMER.
 CHAS. S. HYER.